United States Patent [19]

Lang

[11] Patent Number: 5,687,035

[45] Date of Patent: Nov. 11, 1997

[54] REAR-VIEW MIRROR ASSEMBLY HAVING DUAL MOTOR DRIVEN MIRRORS

[75] Inventor: Heinrich Lang, Seenheimer Strasse Lola, D-91465 Egesheim, Germany

[73] Assignees: Heinrich Lang, Ergersheim, Germany; Sabine Lang, Chapin, S.C.

[21] Appl. No.: 620,377

[22] Filed: Mar. 22, 1996

[51] Int. Cl.$^6$ ................................ G02B 5/10; G02B 5/08; G02B 7/182

[52] U.S. Cl. ........................ 359/864; 359/865; 359/871; 359/875; 359/877

[58] Field of Search ................................ 359/864, 865, 359/871, 872, 873, 874, 875, 877; 248/474, 475.1, 476, 480

[56] References Cited

U.S. PATENT DOCUMENTS

| | | | |
|---|---|---|---|
| 3,375,053 | 3/1968 | Ward | 359/864 |
| 3,424,517 | 1/1969 | Budreck | 359/864 |
| 4,991,950 | 2/1991 | Lang et al. | 359/877 |
| 5,110,196 | 5/1992 | Lang et al. | |
| 5,115,352 | 5/1992 | Do Espirito Santo | |
| 5,268,796 | 12/1993 | Tomerlin et al. | 359/871 |

OTHER PUBLICATIONS

Patent Application for "External Rear-View Mirror for Commercial Vehicles," filed Oct. 6, 1993, USSN:08/132,720.

Patent Application for "Adjustable Rear-View Mirror Arrangement for Motor Vehicles," filed May 19, 1994, USSN: 08/245,952.

"Mekra" Brochure, Mekra Rangau Plastics GmbH & I Co. KG, pp. 1-3 and 15-57, Undated.

Brochure: "Take a look at the Pro View Motorized Mirrors from Retrac Mirrors", Retrac Mirrors, Undated.

*Primary Examiner*—Paul M. Dzierzynski
*Assistant Examiner*—Mohammad Y. Sikder
*Attorney, Agent, or Firm*—Dority & Manning

[57] ABSTRACT

An external rear-view mirror for motor vehicles, particularly trucks, has a support arm and brackets for mounting the support arm to a motor vehicle. A longitudinal housing defines an interior volume and an open-faced front chamber. The support arm has a vertical portion which extends completely through the interior volume in a longitudinal direction. At least two vertically aligned support plates are disposed within the open-faced front chamber and are mounted directly to the support arm vertical portion. A remotely controlled motor drive mechanism is mounted on each support plate front side within the open-faced chamber. An adjustable mirror assembly is configured with each motor drive mechanism and includes a mirror support plate with a mirror glass surface fixed to a front side thereof. The mirror assembly is variably positionable relative to the housing and the support plate by the motor drive mechanism.

14 Claims, 4 Drawing Sheets

REAR-VIEW MIRROR ASSEMBLY HAVING DUAL MOTOR DRIVEN MIRRORS

BACKGROUND OF THE INVENTION

The present invention relates to a rear-view mirror assembly, and in particular to a rear-view mirror for commercial vehicles having dual motor driven mirrors.

Rear-view mirrors for commercial vehicles, particularly commercial trucks, are well known in the art. These well known mirrors include mirrors which are variably positionable by remote actuation of a motor drive unit or manually adjustable. For example, U.S. Pat. Nos. 4,991,950 and 5,110,196 describe various embodiments of motor driven adjustable rear-view mirrors.

In many instances, to provide varying fields of view, it is desirable to have dual vertically aligned mirrors wherein one mirror has a relatively flat mirror surface and the other mirror has a generally convex mirror surface. Unfortunately, in the past, it has been particularly difficult to drive both mirrors with remotely controlled motors, such as dual servomotor systems, due to the excessive weight and space requirements of the motor drive mechanisms. Accordingly, with conventional mirrors of the dual mirror design, one of the mirrors is typically manually adjustable while the other mirror is motor driven. This was necessitated primarily due to the design of the mirrors wherein a substantial portion, if not all, of the weight of the mirror assemblies and motor drive units was supported by the mirror housing.

The present invention relates to an improved dual mirror assembly wherein both mirrors are driven by remotely actuated motor drive mechanisms.

OBJECTS AND SUMMARY OF THE INVENTION

It is therefore a principal object of the present invention to embody a rear-view mirror, particularly for commercial vehicles, wherein the mirror includes motor driven dual mirror surfaces.

An additional object of the present invention is to provide a rear-view mirror incorporating dual motor driven mirrors without adding to the weight and complexity of the mirror.

And still another object of the present invention is to provide a rear-view mirror having dual mirrors wherein either or both mirrors can be interchanged between manually adjustable or motor driven configurations with relative ease and with minimal exchange of parts.

Additional objects and advantages of the invention will be set forth in part in the following description, or may be obvious from the description, or may be learned through practice of the invention.

To achieve the objects and in accordance with the purposes of the invention, as embodied and broadly described herein, an embodiment of the present invention includes an external rear-view mirror for motor vehicles, particularly commercial vehicles such as trucks. The mirror has a support arm and means for mounting the support arm to the motor vehicle, such as conventional brackets or the like. A longitudinal housing is provided having wall segments defining an interior volume and an open-faced front chamber. The support arm includes a vertical portion which extends completely through the interior volume in a longitudinal direction. At least two vertically aligned support plates are disposed within the open-faced front chamber of the housing and are removably attached directly to the support arm vertical portion. Each support plate has a front side and a back side and a clamping mechanism extends from the back side of the support plate through one of the wall segments of the housing into the interior volume for direct clamping engagement with the support arm. The housing is attached directly to the support plate.

A remotely controlled motor drive mechanism is mounted on the front side of each support plate within the open-faced chamber. An adjustable mirror assembly is configured with each motor drive mechanism. Each of the mirror assemblies includes a mirror support plate with a mirror glass surface fixed to a front side thereof. The mirror assembly is variably positionable relative to the housing and the support plate by the motor drive mechanism. The entire weight of the mirror assemblies and the motor drive mechanisms is supported directly by the support plates which are in turn mounted directly on the support arm. Additionally, an individual support plate is provided for each mirror assembly and respective motor drive mechanism.

Preferably, the housing is formed of a relatively inexpensive yet aesthetically pleasing plastic material and the support plates are formed of metal. In a preferred embodiment, the housing comprises a front member which is removably attached to the back side of the support plates, and a back member which is removably attached to the front member. The support plates are mounted to the support arm by any manner of conventional devices, such as a clamping mechanism which includes a clamping block defined on the back side of the support plate, as well as associated engaging clamps.

The motor drive mechanism includes any manner of conventional motor drive systems. For example, a well known motor drive comprises two servomotors mounted to the support plate within the open chamber. A retaining plate is configured with the servomotors wherein the retaining plate is variably positionable relative to perpendicular positioning axes of the servomotors, as commonly understood in the art.

In an alternative embodiment, the rear-view mirror may include an antenna mounting bracket which is also configured on the back side of the uppermost support plate. The antenna mounting bracket is disposed within the housing interior volume wherein the antenna extends through a top surface of the housing.

Preferably, the support plates and motor drive mechanisms with attached retaining plates are essentially the same size and are matable with different sized mirror assemblies. For example, in an embodiment of the invention, one of the mirror assemblies includes a relatively long flat mirror surface while the other mirror assembly includes a relatively shorter convex mirror surface. It may be desired to interchange the position of these mirrors without having to interchange the motor drive mechanisms and retaining plates. Thus, the retaining plates are releasably attached to support plates of the mirror assemblies by any manner of conventional interlocking mechanisms, such as conventional slide locks. Thus, depending on customer preference, it is a relatively simple manufacturing process to interchange the position of the mirrors without adding additional parts or expense to the mirror assemblies.

The present invention also includes a mirror as essentially described above which can be fitted or retrofitted to an existing support arm of a commercial vehicle.

The accompanying drawings, which are incorporated in and constitute a part of the specification illustrate embodiments of the invention and, together with the description, serve to explain the principles of the invention.

DETAILED DESCRIPTION OF THE PREFERRED EMBODIMENTS

Figure 1:
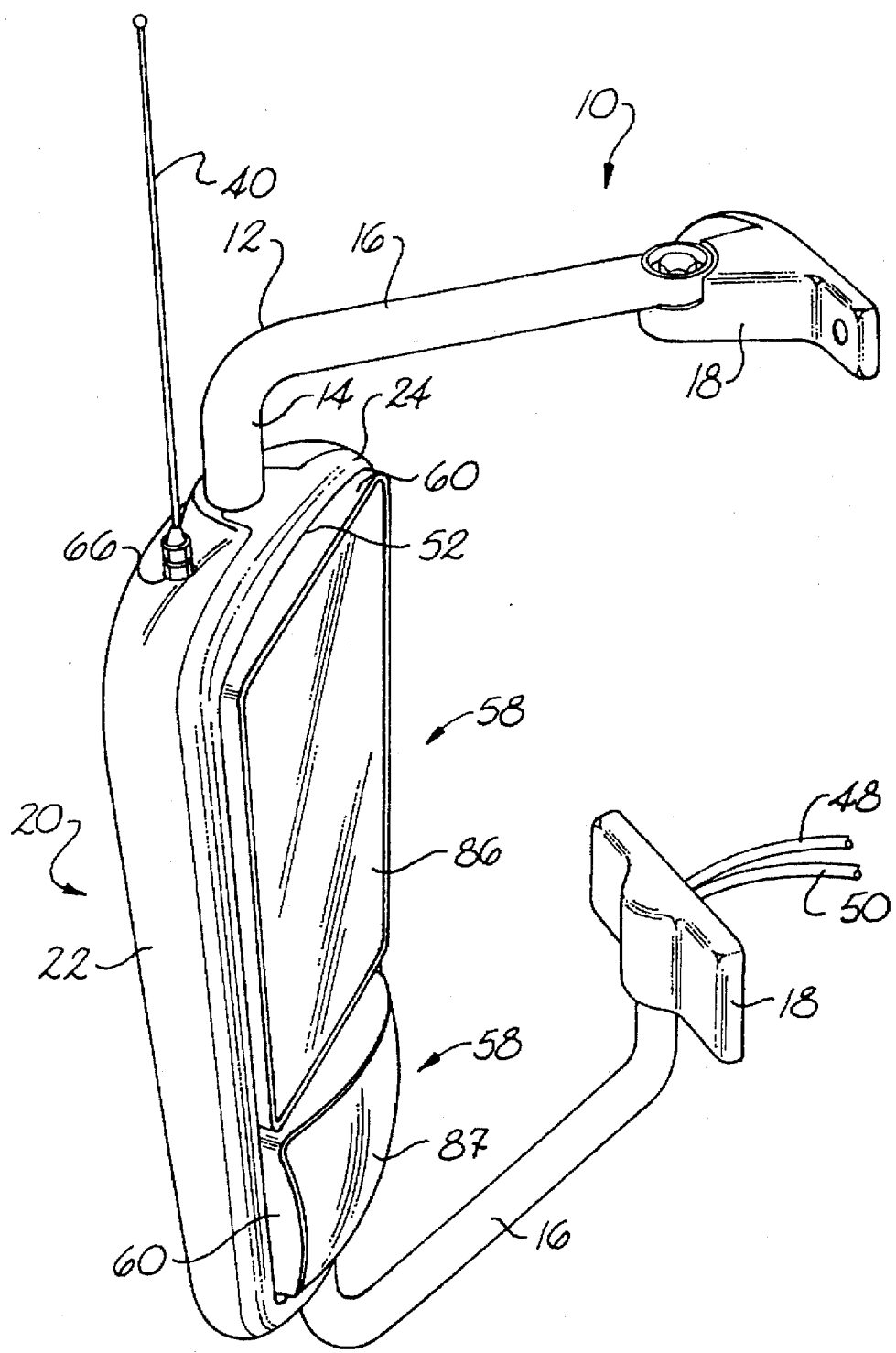
FIG. 1 is a perspective view of a rear-view mirror according to the present invention.

Reference will now be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. The numbering of components in the drawings is consistent throughout the application, with the same components having the same number in each of the drawings.

The present invention will be described herein as it relates to a commercial vehicle, particularly a commercial truck. However, this is not meant as a limitation of the invention and is for illustrative purposes and ease of explanation. It should be appreciated that the rear-view mirror described herein can be utilized on any manner of vehicle, and any such use is contemplated within the scope and spirit of the invention.

Referring to FIG. 1 in general, an external rear-view mirror 10 for motor vehicles is illustrated. External rear-view mirror 10 is designed particularly for commercial vehicles, such as commercial trucks. However, it should be understood that this is not a limitation of the invention and that the rear-view mirror described and claimed herein can be used on any manner of vehicle.

Rear-view mirror 10 includes a support arm 12 which is mounted to the cab or frame of a vehicle by any conventional means, such as brackets 18 illustrated in FIG. 1. This aspect of mirror 10 is well understood by those skilled in the art and a detailed explanation thereof is not necessary for purposes of this disclosure.

Generally, support arm 12 includes a horizontal extending portion 16 which extends out from brackets 18 at a distance from the cab of the vehicle. Horizontal portions 16 are joined by a vertically extending portion 14. Preferably, support arm 12 is hollow so that cables 48, 50 can run through the support arm and are thus protected and hidden from view, as will be explained more fully below.

Mirror 10 includes a housing 20, generally illustrated in FIG. 1. Housing 20 can include any number of interconnected components, or may be formed as an integral component. In the preferred embodiment illustrated particularly in FIGS. 2 through 4, housing 20 includes a front member 24 and a back member 22. The front and back members are separable. An internal volume or space 30 is defined between the front and back members, as particularly seen in FIG. 3. The vertical portion 14 of support arm 12 extends completely through interior volume 30, as particularly seen in FIG. 2.

Housing 20 can be formed of any conventional material, and is preferably formed of an inexpensive yet aesthetically pleasing plastic material. Alternatively, housing 20 could be formed of a metal.

In the illustrated embodiment, housing 20, and particularly front housing member 24, defines an open-faced recess or chamber 52 having an open face 56. In the illustrated embodiment, chamber 52 is defined as a pan-shaped chamber and is circumscribed by front wall member 54 of front housing member 24.

Figure 2:
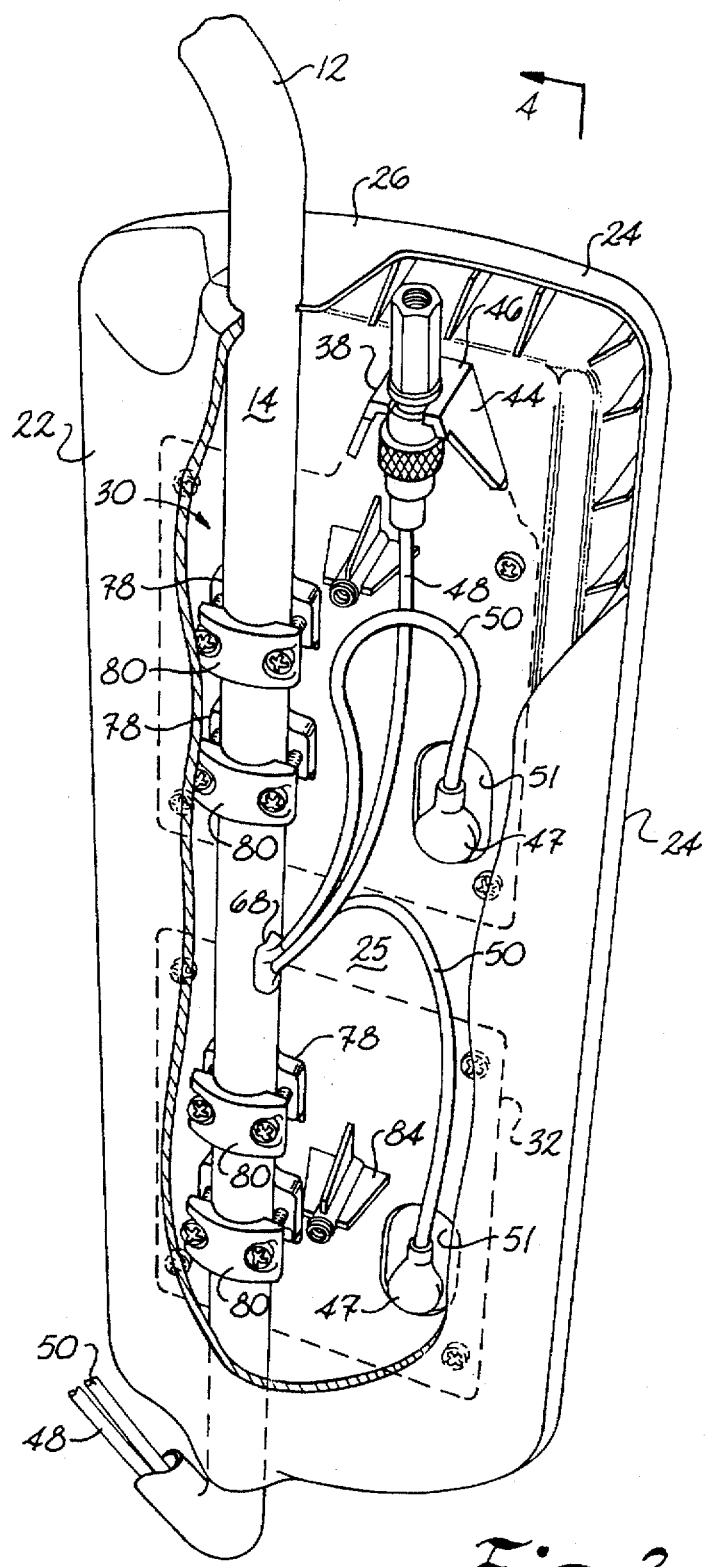
FIG. 2 is a partial cut-away view of the mirror illustrated in FIG. 1 taken from the back side.
Figure 3:
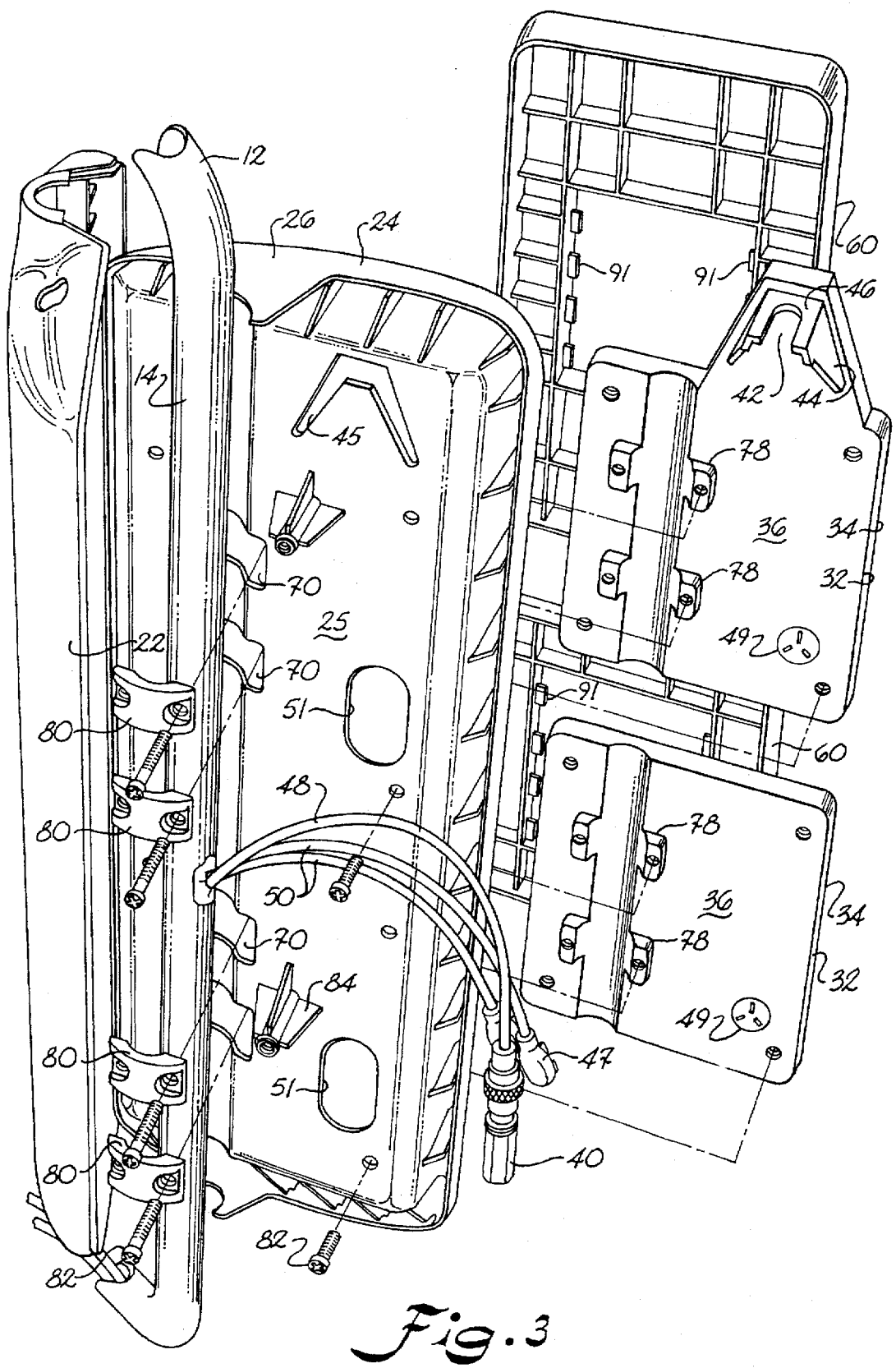
FIG. 3 is a detailed in-line component view of the mirror illustrated in FIG. 2.
Figure 4:
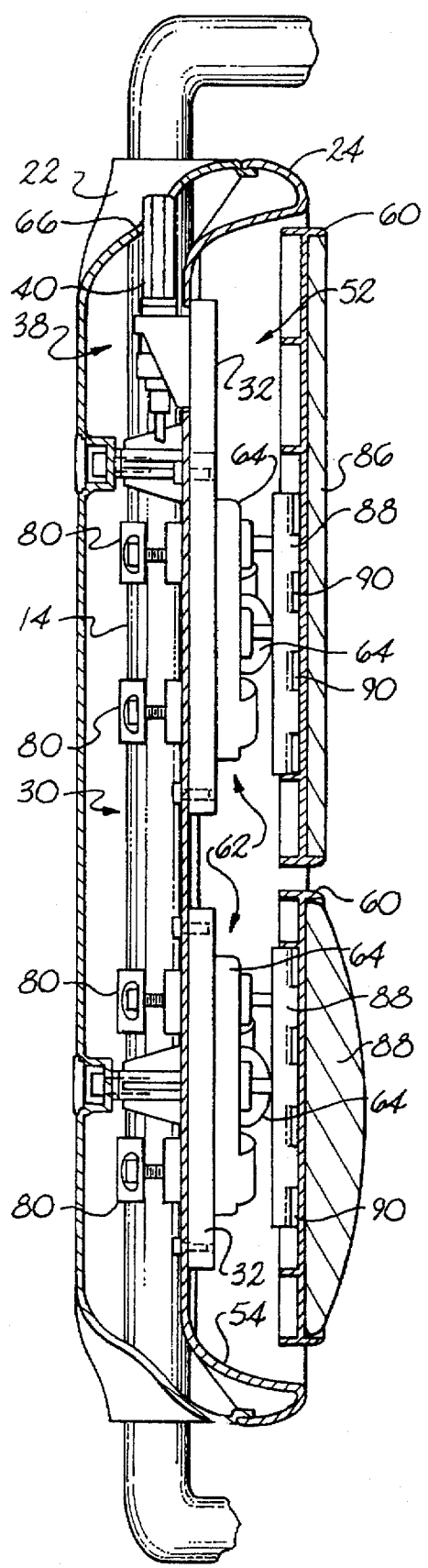
FIG. 4 is a cut-away view of the mirror illustrated in FIG. 2 taken along the lines indicated.

Referring particularly to FIGS. 2 through 4, the inventive rear-view mirror according to the invention includes two support plates 32 vertically aligned on vertical portion 14 of support arm 12. Each support plate 32 is mounted directly to vertical portion 14 by way of, for example, clamp blocks 78 which extend through clamp block openings 70 defined in wall segment 54 of front housing member 24. Clamps 80 engage with clamp blocks 78 to securely hold support plates 32 to support arm 12. As particularly seen in FIGS. 3 and 4, each support plate 32 is essentially the same size, with the exception of the antenna mounting assembly disposed on the uppermost support plate 32.

Housing 20 is attached directly to support plates 32. In the embodiment illustrated, housing front member 24 is attached to the back side 36 of support plates 32 by way of conventional screws 82 which screw through the back side 25 of front wall member 54, as particularly seen in FIGS. 2 and 3. In this manner, support plates 32 are disposed or reside in the open-faced chamber 52. In this embodiment, back member 22 of housing 20 is readily removably attached to front member 24 by means of conventional screws 82 and screw mounts 84 defined on back side 25 of front wall member 54, as particularly seen in FIGS. 3 and 4. In an alternative embodiment, back member 22 may snap fit with front member 24 by any manner of known conventional snap fit mechanisms, such as bayonet-type fasteners.

At least one mirror assembly 58 is associated with support plate 32, as generally seen in FIG. 1. FIG. 1 illustrates an embodiment wherein two mirror assemblies 58 are utilized. Top mirror assembly 58 includes a relatively flat mirror surface 86 vertically aligned over a convex mirror surface 87. Mirror assembly 58 may be remotely motor-driven or manually adjustable.

Referring particularly to FIGS. 3 and 4, a motor drive mechanism 62 is mounted to front side 34 of each support plate 32. Motor drive mechanism 62 can include any manner of conventional well known motor drive mechanisms. One type of motor drive mechanism contemplated within the scope and spirit of the invention is a conventional drive comprising two electric geared servomotors, by means of which a retaining plate 88 may be pivoted about two perpendicular positioned axes to carry out an adjustment of mirror glass surfaces 86, 87. These servomotor systems are well known to those skilled in the art and a detailed explanation thereof is not necessary for purposes of this disclosure. It should be further understood that any manner of motor drive mechanism may be utilized in this regard. For example, suitable motor drive mechanisms are described in U.S. Pat. Nos. 4,991,950 and 5,110,196, which are incorporated herein in their entirety.

Each mirror assembly 58 may also include a mirror support plate 60 which is remotely positioned by motor drive mechanism 62, or manually adjustable. In the motor drive embodiment illustrated in the figures, mirror support plate 60 is attached to retaining plate 88. Mirror support plate 60 is preferably readily removably attached to retaining plate 88, for instance by means of a sliding lock mechanism.

Retaining plates 88 are also of essentially the same size and comprise slide lock members 90 disposed at least along the side edges thereof. As described above, each mirror assembly includes a mirror support plate 60. Each mirror support plate 60 has corresponding slide lock members 91 which slidingly engage with slide lock members 90 of retaining plate 88. Thus, it should be understood that access is provided to chamber 52 and motor drive mechanism 62 merely by releasing support plates 60 from retaining plate 88. Also, it should be appreciated that the position of the mirrors can be interchanged since each support plate can engage with either of the retaining plates 88. Also, a suitable sliding lock mechanism is described in co-pending U.S. application Ser. No. 08/245 952, and U.S. Pat. No. 5,615,054, which is incorporated herein by reference.

Mirror surfaces 86, 87 are adhered to the front of mirror support plates 60 by any conventional manner, such as adhesives, retaining lips and like devices, etc.

Referring particularly to FIG. 2, a power cable 50 with connector 47 is provided to each motor drive mechanism 62 through an opening 51 in the back side 36 of support plate 32. Connectors 47 mate with receiving connectors 49. Preferably, cable 50 runs through support arm 12 directly into the motor vehicle.

Rear-view mirror 10 may also include an antenna mounting bracket 38 formed integral on the upper support plate 32. In the embodiments illustrated, bracket 38 is formed on back side 36 of support plate 32. For example, bracket 38 may be molded or stamped integrally with metal support plate 32, or may be welded directly thereto. In the embodiment illustrated, bracket 38 extends from back side 36 of support plate 32 through antenna mount opening 45 defined in back wall 54 of front member 24. Antenna mounting bracket is formed by two side members 44 joined by a top member 46. An antenna recess or slot 42 is defined in top member 46. A conventional antenna 40 is slidably fitted into recess 42. As shown particularly in FIG. 1, antenna 40 includes an extending portion which extends out through antenna hole 66 formed in a top surface 26 of front member 24 or back member 22 depending on the configuration of the housing. An antenna cable 48 is provided which preferably enters support arm 12 through hole 68 and runs therethrough along with power cable 50. In this manner, it should be understood, that the entire antenna mounting assembly, including bracket, antenna, and antenna cable is supported entirely by upper support plate 32 which is mounted directly to support arm 12. Additionally, the entire antenna mounting assembly is contained within the interior volume 30 of housing 20. Thus, as particularly seen in FIG. 1, the antenna forms an integral component of the rear-view mirror assembly. The antenna mounting bracket and cable are not external to the mirror and are thus relatively aesthetically pleasing. Additionally, by mounting the components internal to the housing, wind noise and vibration caused by the antenna components is significantly reduced.

By mounting the motor drive mechanisms directly to the individual support plates 32, which are in turn mounted directly to support arm 12, housing 20 supports relatively little weight and, thus, can be formed of a relatively inexpensive yet aesthetically pleasing plastic material. The housing does not need to be formed of steel to support the weight of the internal mechanisms. Also, by providing an individual support plate 32 for each motor drive mechanism, the support plates can be kept relatively small which further reduces the overall weight of the mirror. Also, by locating the support plates 32 within the open-faced chamber 52, the complexity of housing 20 and drive mechanisms is further reduced.

It will be apparent to those skilled in the art that various modifications and variations can be made in the apparatus of the present invention without departing from the scope or spirit of the invention. For example, the housing defining the interior volume can include any number of separable components. Additionally, the mirror assembly can include a remote motor drive mechanism or be manually adjustable. Thus, it is intended that the present invention cover the modifications and variations of this invention provided they come within the scope of the appended claims and their equivalents.

What is claimed is:

1. An external rear-view mirror for motor vehicles, comprising:

a support arm, and means for mounting said support arm to a motor vehicle;

a longitudinal housing, said housing further comprising wall segments defining an interior volume and an open faced front chamber, said support arm comprising a vertical portion extending completely through said interior volume in a longitudinal direction;

at least two vertically aligned support plates disposed within said open faced front chamber and removably attached directly to said support arm vertical portion, each said support plate having a front side and a back side and a clamping mechanism extending from said back side through said housing into said interior volume for direct clamping engagement with said support arm, said housing attached to said support plate;

a remotely controlled motor drive mechanism mounted on each said support plate front side within said open faced chamber;

an adjustable mirror assembly configured with each said motor drive mechanism, each said mirror assembly comprising a mirror support plate with a mirror glass surface fixed to a front side thereof, said mirror assembly being variably positionable relative to said housing and said support plate by said motor drive mechanism; and wherein the entire weight of said mirror assemblies and said motor drive mechanisms is supported directly by said support plate which is in turn mounted directly on said support arm.

2. The rear-view mirror as in claim 1, wherein said housing is formed of a plastic material and said support plates are formed of metal.

3. The rear-view mirror as in claim 2, wherein said housing comprises a front member removably attached to said back side of said support plate, and a back member removably attached to said front member.

4. The rear-view mirror as in claim 1, wherein said clamping mechanism comprises a clamping block defined on said back side of said support plate, and associated engaging clamps.

5. The rear-view mirror as in claim 1, wherein said motor drive mechanism comprises two servo motors mounted to said support plate within said open chamber, and a retaining plate configured with said servo motors wherein said retaining plate is variably positionable relative to perpendicular positioning axes of said servo motors, said mirror support plates removably attached to said retaining plates.

6. The rear-view mirror as in claim 1, further comprising an antenna mounting bracket configured on said back side of the uppermost said support plate, said antenna mounting bracket extending into said housing interior volume.

7. The rear-view mirror as in claim 5, wherein said retaining plates are essentially the same size, and said mirror assemblies are of different sizes wherein said mirror comprises two different sized mirror surfaces.

8. The rear-view mirror as in claim 7, wherein one of said mirror surfaces comprises a convex mirror and the other said mirror surface comprises a relatively flat mirror.

9. The rear-view mirror as in claim 8, wherein said mirrors are interchangeable on said retaining plates.

10. An external rear-view mirror for motor vehicles, particularly commercial trucks, comprising:

a support arm having a vertical section, and brackets for mounting said support arm to a motor vehicle;

a housing having a front member and a back member, said housing further comprising an interior volume defined between said front and back members, said front member further defining an open-faced frontal chamber, said vertical section of said support arm extending longitudinally through said housing interior volume;

at least two vertically aligned support plates disposed within said open faced front chamber and removably clamped directly to said support arm vertical portion, each said support plate having a front side and a back side and a clamping mechanism extending from said back side through said housing front member into said interior volume for direct clamping engagement with said support arm, said housing front member attached directly to said support plate and said housing back member removably attached to said front member;

a remotely controlled motor drive mechanism mounted on each said support plate front side within said open faced chamber, said motor drive mechanism comprising at least two servo motors in driving engagement with a retaining plate wherein said servo motors variably position said retaining plate about perpendicular positioning axes;

a first mirror support plate removably attached to one of said retaining plates, and second different size mirror support plate removably attached to said other retaining plate, each said mirror support plates having a mirror glass surface attached to a front side thereof, said different sized mirror support plates being interchangeable on said retaining plates; and wherein the entire weight of said mirror assemblies and said motor drive mechanisms is supported directly by said support plates which are in turn mounted directly on said support arm.

11. An external rear-view mirror for mounting to a support arm of a motor vehicle, particularly commercial trucks, comprising:

a housing having an internal volume and defining an open-faced frontal chamber;

at least two vertically aligned support plates disposed within said open faced chamber, said support plates having at least one clamping mechanism extending through said housing into said interior volume for mounting said support plate directly to a vehicle support arm of the vehicle which extends longitudinally through said housing interior volume, said housing attached directly to said support plate;

a remotely controlled motor drive mechanism mounted on each said support plate within said open faced chamber;

an adjustable mirror assembly configured with each said motor drive mechanism, each said mirror assembly comprising a mirror support plate with a mirror glass surface fixed to a front side thereof, said mirror assembly being variably positionable relative to said housing and said support plate by remote actuation of said motor drive mechanism; and wherein the entire weight of said mirror assemblies and said motor drive mechanisms is supported directly by said support plates which are in turn mounted directly on said support arm.

12. The rear-view mirror as in claim 11, wherein said housing is formed of a plastic material and said support plates are formed of metal.

13. The rear-view mirror as in claim 12, wherein said housing comprises a front member removably attached to said back side of said support plate, and a back member removably attached to said front member.

14. The rear-view mirror as in claim 11, wherein said motor drive mechanism comprises two servo motors mounted to said support plate within said open chamber, and a retaining plate configured with said servo motors wherein said retaining plate is variably positionable relative to a perpendicular positioning axes of said servo motors, said mirror support plates removably attached to said retaining plates.

* * * * *